(12) United States Patent
Ruiz

(10) Patent No.: US 11,822,156 B2
(45) Date of Patent: Nov. 21, 2023

(54) ADJUSTABLE LOUPE APPARATUS

(71) Applicant: Salvador Ruiz, Spring, TX (US)

(72) Inventor: Salvador Ruiz, Spring, TX (US)

(*) Notice: Subject to any disclaimer, the term of this patent is extended or adjusted under 35 U.S.C. 154(b) by 154 days.

(21) Appl. No.: 17/397,098

(22) Filed: Aug. 9, 2021

(65) Prior Publication Data
US 2022/0043284 A1   Feb. 10, 2022

Related U.S. Application Data

(60) Provisional application No. 63/063,346, filed on Aug. 9, 2020.

(51) Int. Cl.
*G02C 9/02* (2006.01)
*G02B 7/02* (2021.01)

(52) U.S. Cl.
CPC ............. *G02C 9/02* (2013.01); *G02B 7/02* (2013.01)

(58) Field of Classification Search
CPC .......... G02C 9/02; G02C 7/088; G02B 7/02; G02B 7/003; G02B 7/023
See application file for complete search history.

(56) References Cited

U.S. PATENT DOCUMENTS 4,349,246 A * 9/1982 Binner ................ G02C 9/04
  351/50
6,356,400 B1 * 3/2002 Goff ................... G02B 7/002
  351/158

* cited by examiner

*Primary Examiner* — James C. Jones

(57) ABSTRACT

A loupe apparatus includes a support, a post coupled to the support, and a lens holder rotatably coupled to the post. The lens holder is rotatable around an axis of the post. The lens holder includes an arm, an extension coupled to the arm with a ball and socket joint, and a lens coupled to the extension.

13 Claims, 15 Drawing Sheets

ADJUSTABLE LOUPE APPARATUS

CROSS-REFERENCE TO RELATED APPLICATION(S)

This application claims benefit of U.S. Provisional Application No. 63/063,346, filed Aug. 9, 2020, which is incorporated herein by reference in its entirety.

FIELD OF THE DISCLOSURE

This disclosure, in general, is directed to lens systems and methods that find particular use by watch repairers or jewelers.

BACKGROUND

There is much appreciation and value placed on buying miniaturized mechanical systems. Particularly, well-designed watches with intricate mechanical systems fetch high prices in the marketplace. Often, such watch designs incorporate many features, and the mechanisms to support these features are fit into a small space, requiring miniaturized design that is difficult to see with the naked eye.

Similarly, jewelry is prized for its intricate designs and gemstones with many facets. Both cutting and evaluating gemstones utilizes the observation of features that are often not clearly seen by the naked eye. Similarly, when cutting intricate details into precious metals, jewelers utilize magnification.

But one's ability to focus changes over time with strain, fatigue, and other factors, such as blood sugar levels and blood-pressure. Over the course of the day, one's ability to focus with a fixed loupe system may change, causing additional strain on the user. Such strain can induce mental fatigue and headaches.

As such, an improved loupe apparatus would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a loupe apparatus includes a support, a post attached to the support, and a lens holder rotatably coupled to the post. The lens holder includes an arm and an extension attached to the arm with a ball and socket joint. The lens holder holds a lens. The support can include a coupling that attaches to a pair of glasses. For example, the support can attach to the temples of the pair of glasses. In another example, the support can attach to a bridge on the frame of the pair of glasses. Further example, the support can form a nose bridge and be attached to a headband that extends in one or both directions around the side of the head of a user. In a further example, a second lens holder can be attached to the post and includes an arm, a ball and socket joint, and an extension attached to the arm through the ball and socket joint.

Figure 1:
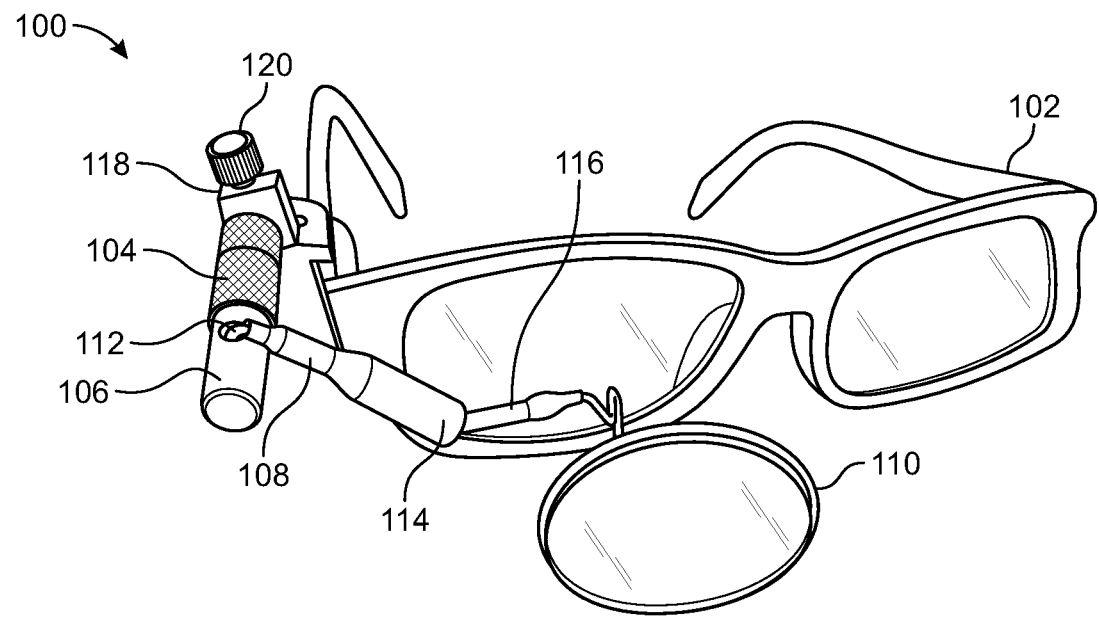
FIG. 1 includes an illustration of an example loupe apparatus attached to a pair of glasses.

FIG. 1 includes an illustration of example loupe apparatus 100 that couples with a pair of glasses 102 at the temple. For example, a support 118 of the loupe apparatus 100 couples to a temple of the pair of glasses 102. The support 118 is coupled to a post 104. For example, the post 104 can be coupled to the support 118 through an adjustable connector 120 that allows the post to be moved in and out along the axis of the post 104. The post 104 can be a solid post or can be hollow. In an example, the post 104 can be a solid cylinder or a thick wire. In another example, the post can be a hollow cylinder.

A lens 110 can be secured to the post 104 using a lens holder that includes a tube 106 disposed over the post 104. In an example, the tube 106 can rotate around an axis of the post 104.

An arm 108 can be secured to the tube 106 with a fitting 112. In an example, the fitting 112 can be fixed. In another example, the fitting 112 allows the arm to rotate relative to the tube 106.

The arm 108 can be coupled to an extension 116 through a ball and socket joint 114. In the illustrated example, the ball and socket joint 114 is disposed within the arm 108 and the extension 116 is attached to the ball of the ball and socket joint 114. Alternatively, the ball and socket joint 114 can be housed in the extension 116 and the arm 108 can be connected to the ball of the ball and socket joint 114. The extension 116 secures the lens 110.

Figure 2:
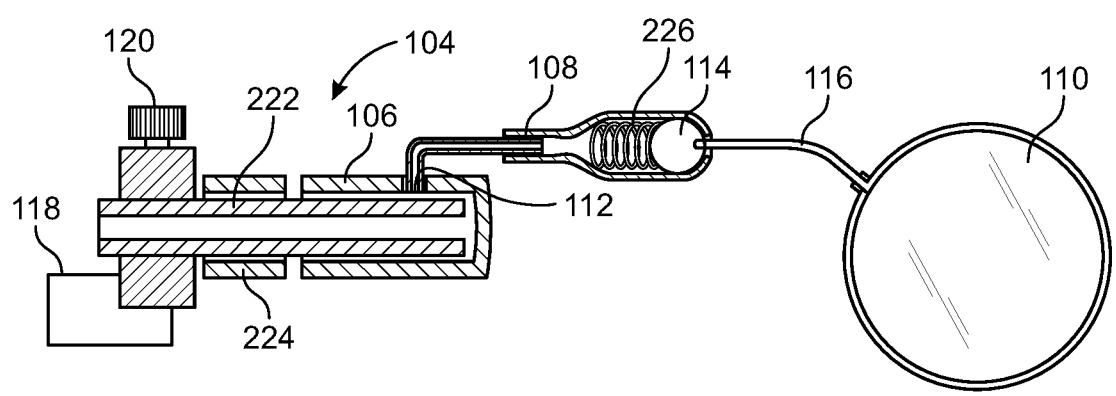
FIG. 2 includes a cross-sectional illustration of the example loupe apparatus.

FIG. 2 illustrates a cross-section of the loupe apparatus 100. In the illustrated example, a hollow tube 222 of the post 104 is secured in the adjustable connector 120 of the support 118. An optional grip sleeve 224 is secured around the hollow tube 222. The loupe apparatus includes a tube 106, and an arm 108 is secured to the tube 106 by fitting 112. The tube 106 is disposed to axially rotate around the hollow tube 222. The arm 108 is attached to an extension 116 through a ball and socket joint 114 that includes a ball 114 secured within the arm 108. The extension 116 secures the lens 110.

The ball and socket joint 114 includes a spring 226 to secure a ball in place against an opening in a frame of the arm 108. As illustrated, the arm 108 forms the frame around the ball and socket joint 114. In an alternative example, the extension 116 can form a frame around the ball and socket joint 114.

Optionally, the lens holder can be removable from the post 104 by guiding the tube 106 off of the post 104. Alternatively, the tube 106 can be secured to the hollow tube 222.

Figure 3:
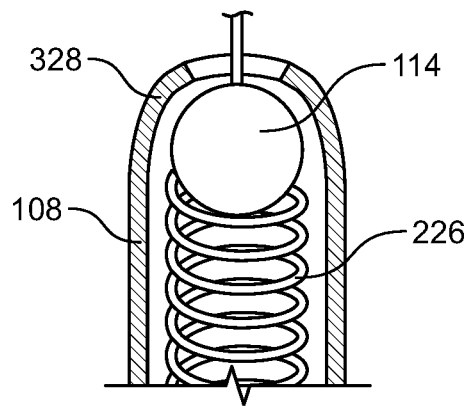
FIG. 3 and FIG. 4 include cross-sectional illustrations of example ball and socket joints.
Figure 4:
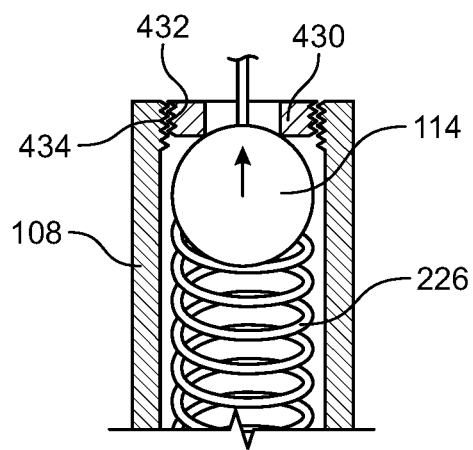

FIG. 3 and FIG. 4 illustrate example embodiments of the housing surrounding the ball and socket joint. As illustrated in FIG. 3, a frame of the arm 108 secures the spring 226 and the ball of the ball and socket joint 114 with a cramped wall 328 of the arm 108. The ball of the ball and socket joint 114 is secured to an extension that extends out of an opening of the wall 328.

In an alternative example illustrated in FIG. 4, the distal end of the arm 108, can include threading 434 to which a threaded insert 430 having opposing threads 432 can be secured. The insert 430 includes a center hole through which an extension can be attached to the ball of the ball and socket joint 114.

Figure 5:
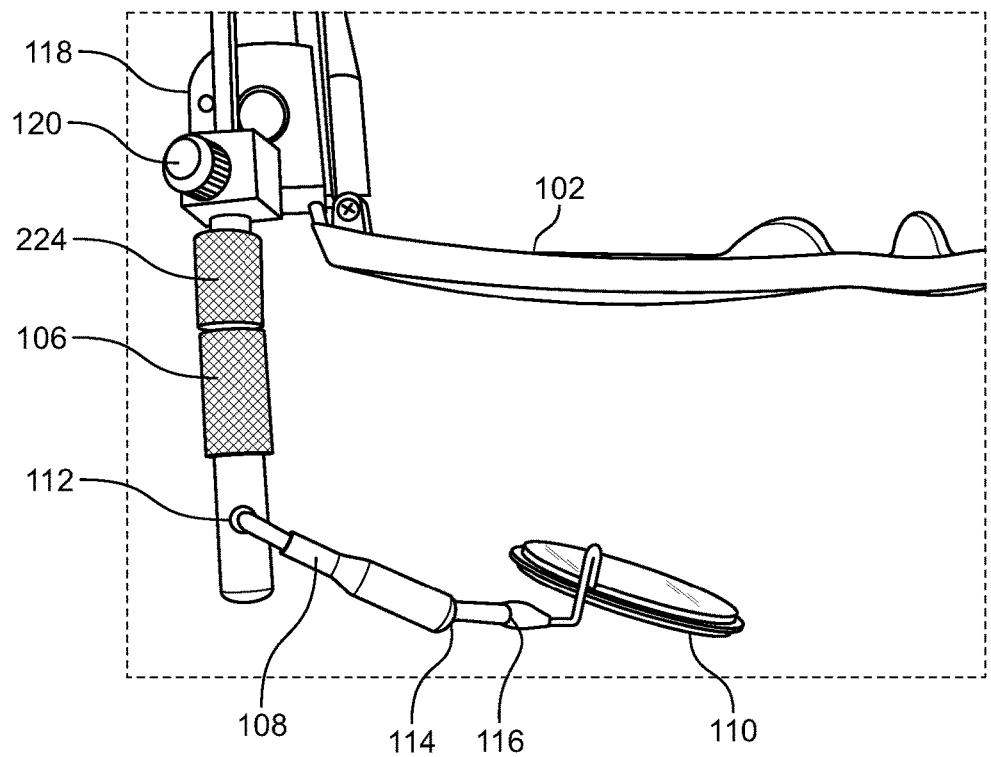
FIG. 5 and FIG. 6 include illustrations of the example loupe apparatus attached to the pair of glasses.
Figure 6:
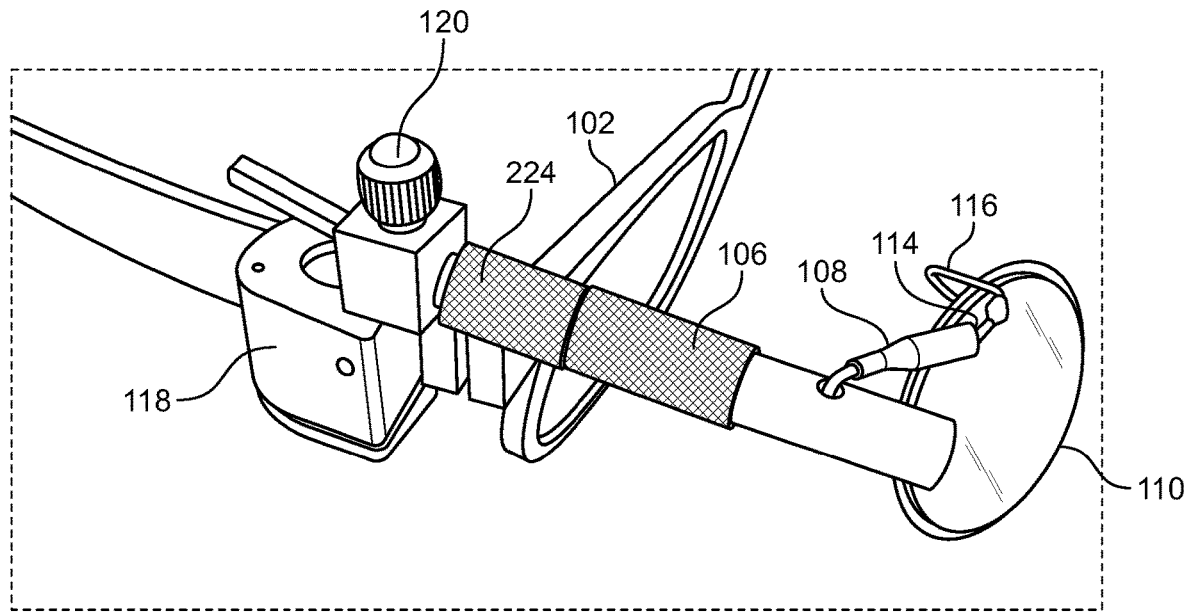

FIG. 5 and FIG. 6 include further illustrations of the loupe apparatus in which the support 118 is secured to the temple of the pair of glasses 102. Optionally, a solid bar can be attached to the post 104 and the bar can engage the adjustable connector 120. Further, as illustrated in FIG. 5, the arm 108 can rotate around joint 112 within the page. The lens 110 can rotate in multiple directions by virtue of the ball and socket joint 114. In particular, as the arm 108 rotates around the joint 112, the lens 110 can move out of a plane parallel to a plane of the lenses of the pair of glasses 102. By virtue of the ball and socket joint 114, the lens 110 can be moved into a plane parallel to the plane of the lens of the pair of glasses 102. The distance between the lens 110 of the loupe apparatus 100 and the lens of the pair of glasses 102 can change a focus, image position, or magnification of the object viewed through the lens 110 and the pair of glasses 102.

Figure 7:
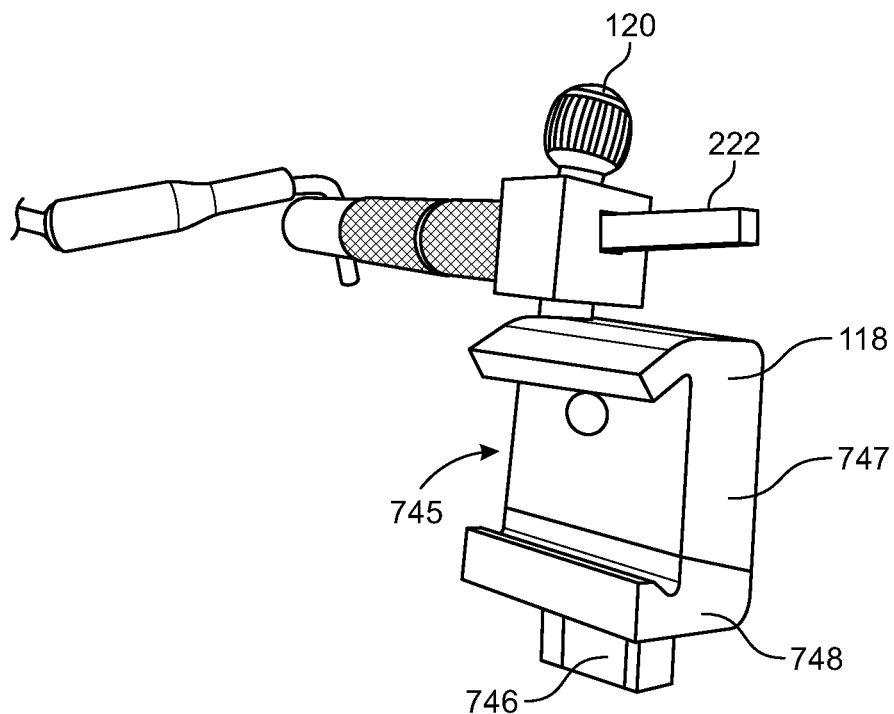
FIG. 7 includes an illustration of an example support of the loupe apparatus.

In the example illustrated in FIG. 5 and FIG. 6, the support 118 couples at a side of the temples of the glasses. For example, as illustrated in FIG. 7, the support 118 can include an opening 745 to the side that when secured to the temple of the frame of glasses would face the head of the wearer. Further, the support 118 can include a first portion 747 and a second portion 748. The second portion 748 can be moved along guide 746 to permit adjusting the opening 745 for different sized temples of pairs of glasses.

Figure 8:
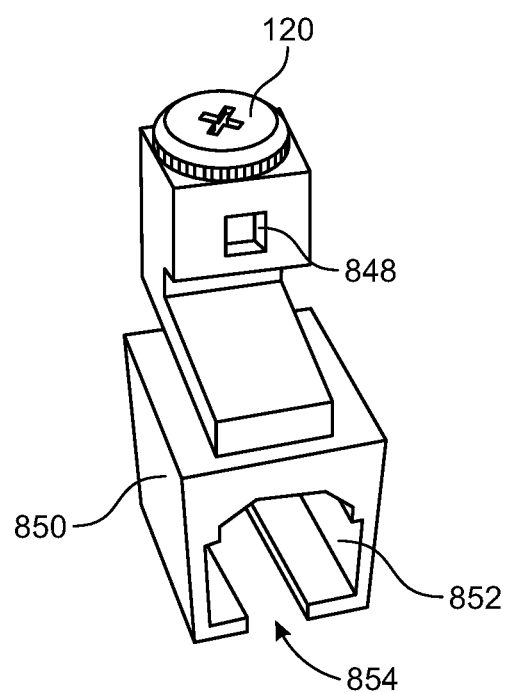
FIG. 8 includes an illustration of an alternative example of a support.

In an alternative example illustrated in FIG. 8, the support 850 includes an opening 854 extending downward when installed on the temples of the frame of glasses. As such, the temple of the glasses extends through the channel 852. The adjustable coupling 120 can include an opening, for example, a square opening 848, to receive a portion of the post of the loupe apparatus.

Figure 9:
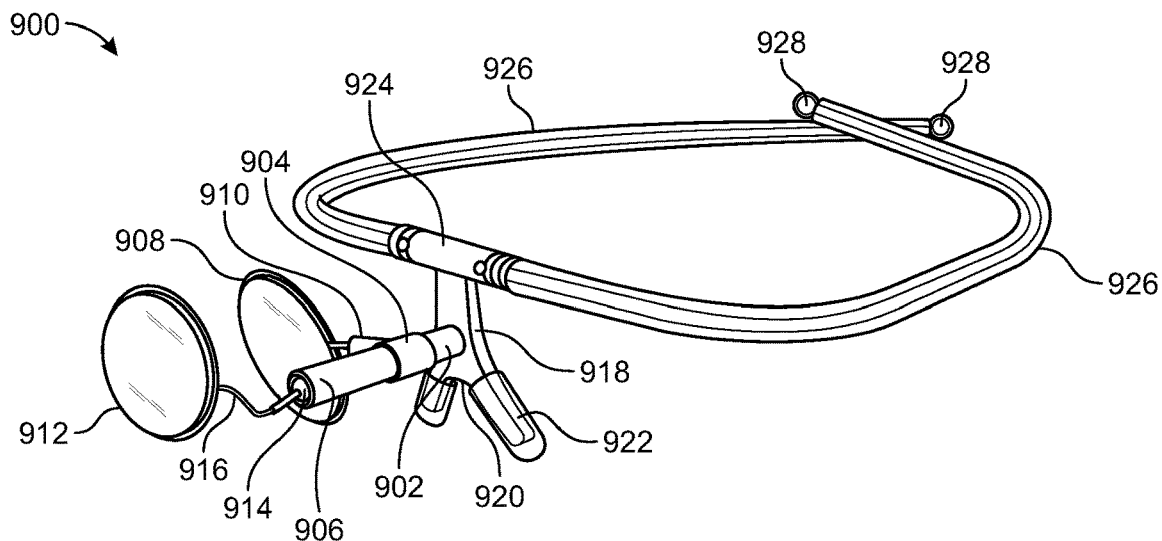
FIG. 9 and FIG. 10 include illustrations of another example loupe apparatus.
Figure 10:
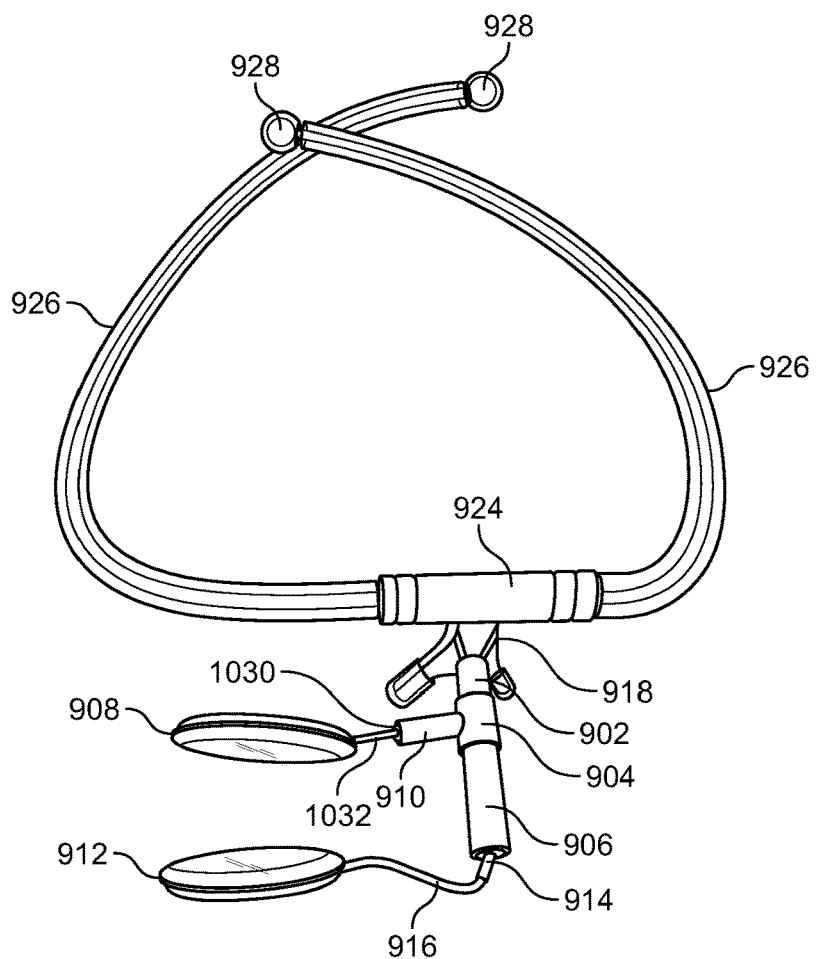

In an alternative example illustrated in FIG. 9 and FIG. 10, a loupe apparatus 900 includes a post 902 secured to a support 918. The loupe apparatus 900 can secure two lenses 908 and 912. For example, a first lens holder can include a tube at 904 connected to an arm 910 that secures a ball and socket joint 1030 that holds an extension 1032 securing the lens 908. A second lens 912 can be secured to the post by a tube 906 that secures a ball and socket joint 914 at a distal end of tube 906. The ball and socket joint 914 is secured to an extension 916 that holds the lens 912.

The support 918 can form a nose bridge 920. The bridge 920 can include arms 922 that are configured to extends on either side of the nose. The support can further include a cross piece 924 that is secured to a headband 926. The headband 926 can extend in one direction or can extend in both directions around the head of the wearer. Optionally, the headband 926 includes balls 928 secured to the distal end of the headband 926.

Figure 11:
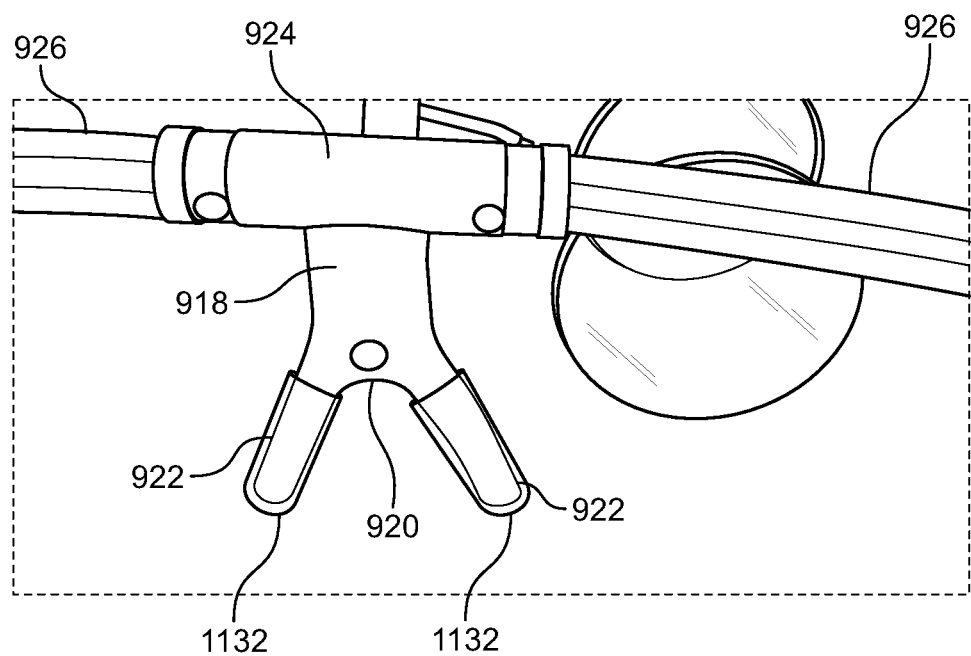
FIG. 11 includes an illustration of a nose bridge of the example loupe apparatus.

As illustrated in FIG. 11, the arms 922 are configured to extend around the nose of the wearer and can include resilient coverings 1132. In an example, the resilient coverings 1132 can be formed of an elastomeric material such as a rubber. For example, elastomeric material can be a polyurethane, silicone rubber, butadiene rubber, acrylonitrile butadiene styrene copolymer (ABS), polyacrylamide, ethylene propylene diene monomer rubber (EPDM), or a combination thereof, among other elastomeric materials.

Figure 12:
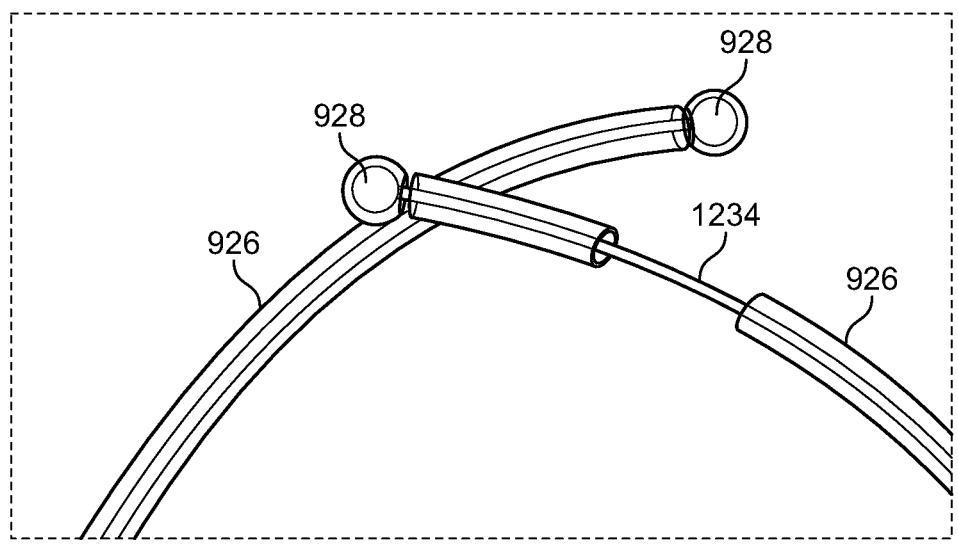
FIG. 12 includes an illustration of an example headband of the example loupe apparatus.

The headbands 926 can be formed of a polymer sheath surrounding a wire 1234, as illustrated in FIG. 12. The polymeric sheath be formed of a polyolefin, such as polyethylene or polypropylene, silicone, polyacrylamide, EPDM, ABS, or other flexible polymeric materials. At the distal ends of the headbands 926 are attached balls 928, which can be formed of similar polymeric materials as the polymeric sheath.

Figure 13:
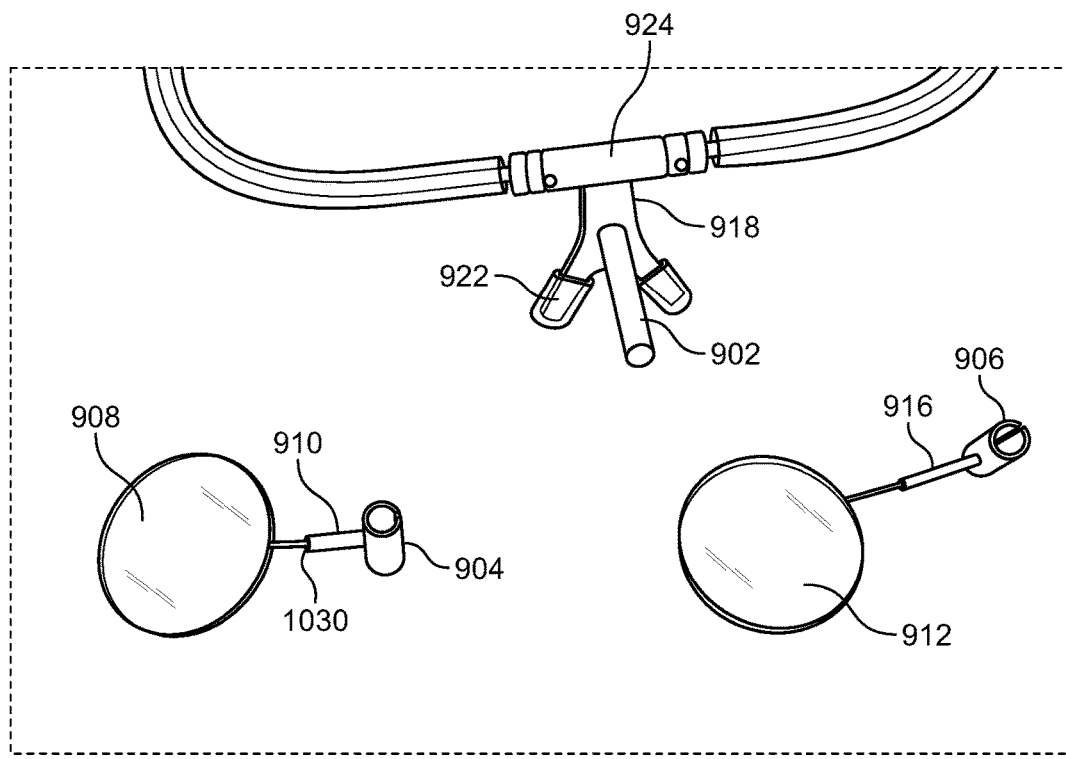
FIG. 13 includes an illustration of the unassembled loupe apparatus.
Figure 14:
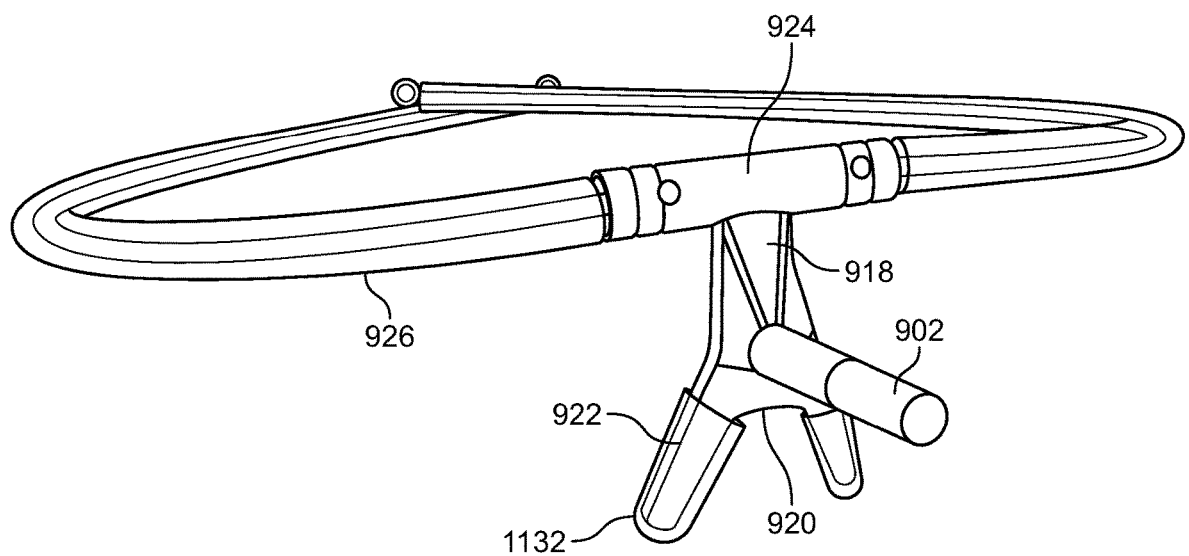
FIG. 14 includes an illustration of a nose bridge support and post of an example loupe apparatus.

In a further example, various configurations of lens holders can be formed to be removable or interchangeable onto the post 902 of the loupe apparatus 900. For example, as illustrated in FIG. 13, the lens holders can be removed from the post 904. As such, a user can decide which lens to use or whether to use one or two lenses. In an example, the user can select from a set of lenses to apply to the post 902 of the loupe apparatus 900. In a further example, the lenses are removeable and replaceable within the lens holders. FIG. 14 includes a further example of the support forming a nose bridge and attached to the post 902.

Figure 15:
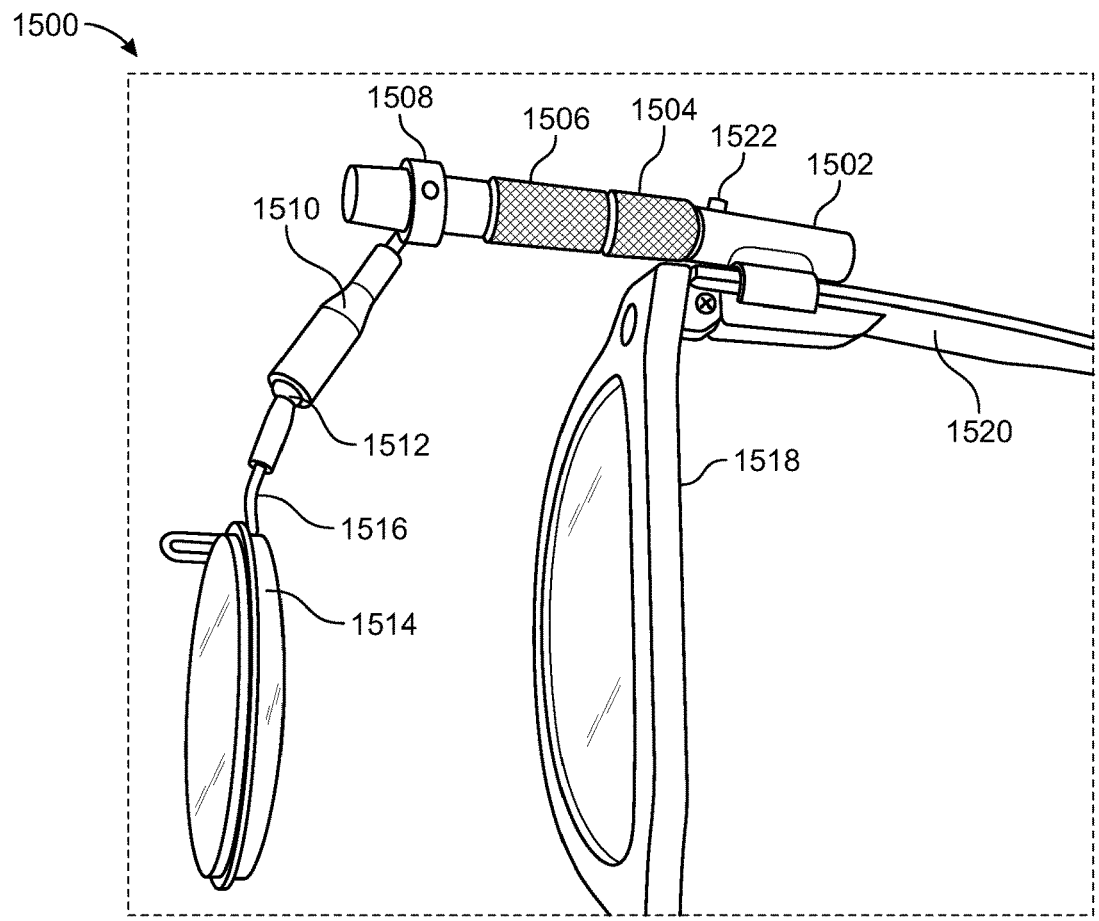
FIG. 15 includes an illustration of another example loupe apparatus attached to a pair of glasses.

FIG. 15 illustrates a further embodiment of a loupe apparatus 1500. A support, such as a clip 1502, is secured to the temple 1520 of a pair of glasses 1518. A post 1504 slides into attachment with the clip 1502 by virtue of a guidepost 1522. A lens 1514 can be secured to the post 1504 using a lens holder. For example, the lens holder includes a tube 1506 attached to the post 1504. A collar 1508 can extend around the tube 1506 and can secure an arm 1510 to the tube 1506. The arm 1510 includes a ball and socket joint 1512 attached to an extension 1516 that secures the lens 1514.

Figure 16:
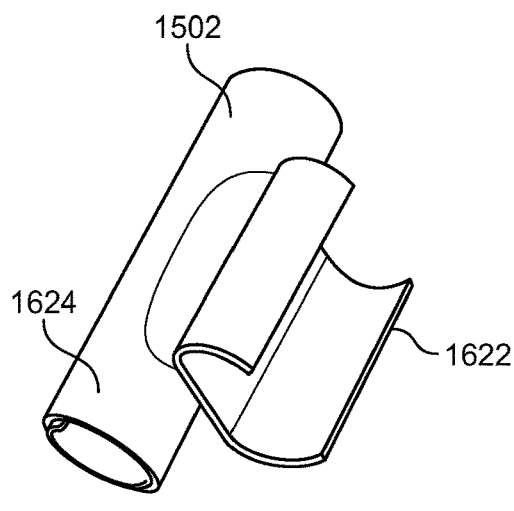
FIG. 16 and FIG. 17 include illustrations of example clips of the example loupe apparatus.
Figure 17:
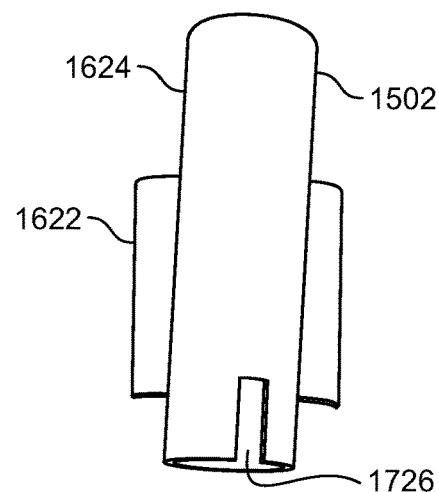

As illustrated in FIG. 16 and FIG. 17, the clip 1502 can include a hollow tube 1624 and a guide 1622 that fits over the temple 1520 of the pair of glasses. As illustrated in FIG. 17, a slot 1726 can receive the guidepost 1522 that prevents the rotation of the post 1502, once inserted into the tube 1624 of the clip 1502

Figure 18:
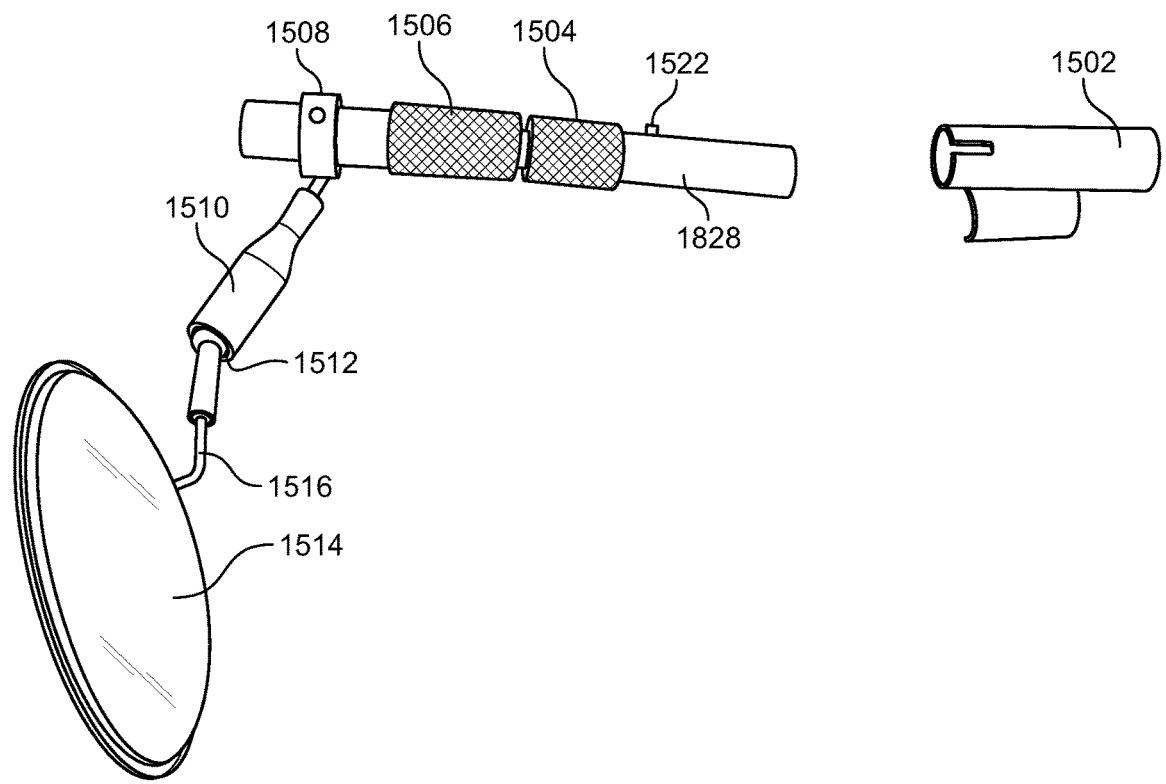
FIG. 18 includes an illustration of an unassembled loupe apparatus.

As further illustrated in FIG. 18, the post 1504 can be detached from the support clip 1502. A portion 1828 of the post 1504 is configured to fit into the tube of the support 1502.

Figure 19:
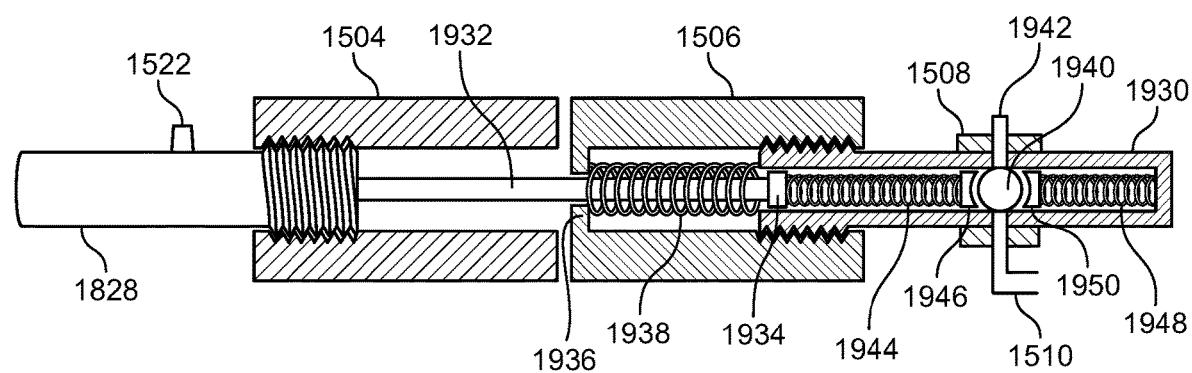
FIG. 19 includes a cross-sectional illustration of an example loupe apparatus.

FIG. 19 illustrates a cross-section of an example post and lens holder. For example, the post 1504 is secured to a portion 1828 that includes the guide 1522 by a threaded connection. The tube 1506 is secured around or applied over a central bar or cylinder 1932 and is connected to an additional tube 1930, for example, by a threaded connection. A spring 1938 extends along the central bar 1932 between lips 1936 of the tube 1506 and an end 1934 of the central bar 1932. A portion of an arm 1510 of the lens holder extends through the collar 1508 and a ball 1940 disposed within the tube 1930. A distal end 1942 of the arm 1510 can be secured by the collar 1508 to prevent the arm from pulling through the ball 1940.

The loupe apparatus can further include a block 1946 attached to spring 1944. A spring 1944 pushes the block 1946 against the ball 1940, for example, using the distal end of 1934 of the central bar 1932 as a foundation to push against. On the other end, a block 1950 is pushed against the ball 1940 by a spring 1948 using a distal end or closed end of the tube 1930 as support.

Figure 20:
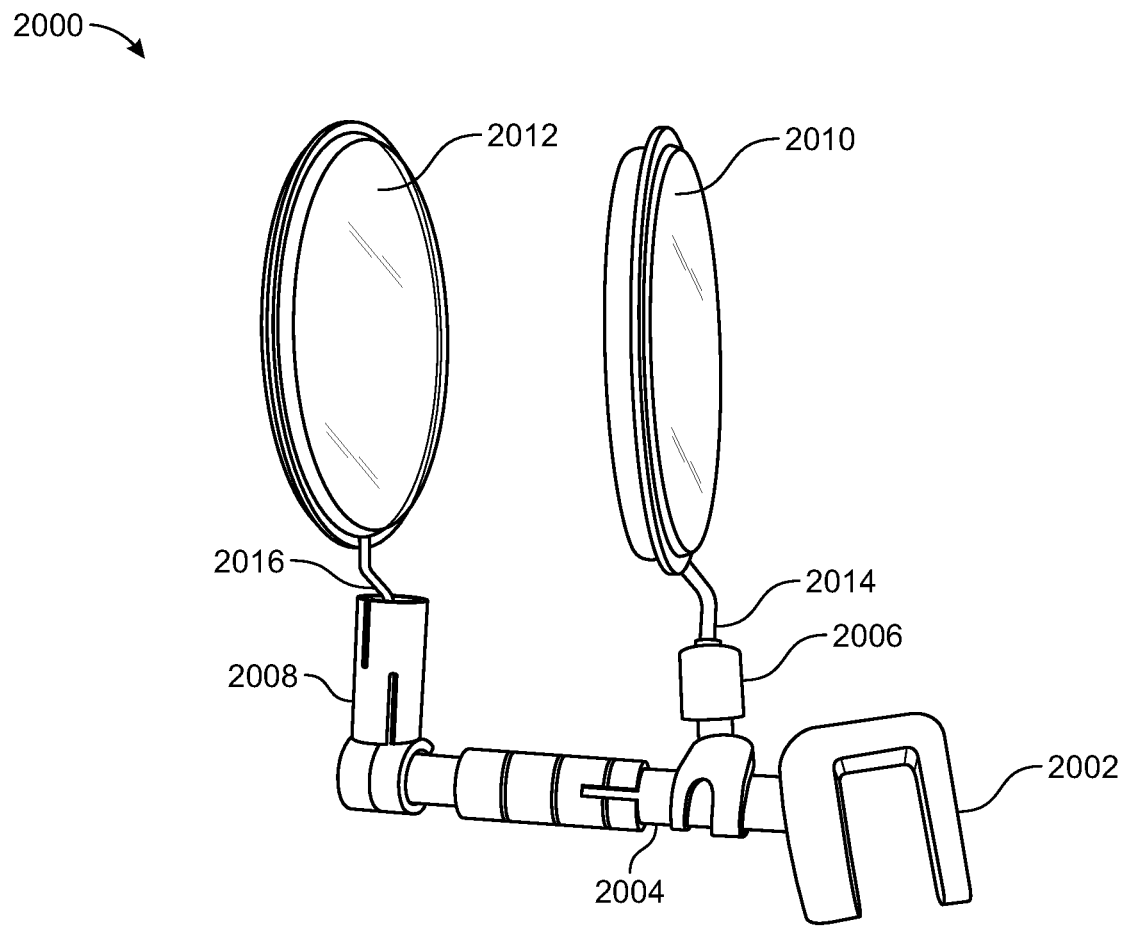
FIG. 20 includes an illustration of a further example loupe apparatus.

FIG. 20 includes an illustration of a further example of a loupe apparatus 2000. The support 2002 is attached to a post 2004 to which two lens holders are attached. For example, a first lens holder can include an arm 2006 attached to an extension 2014 through ball and socket joint. The extension 2014 can secure lens 2010. A second lens holder can include an arm 2008 that secures an extension 2016 using a ball and socket joint. The extension 2016 can secure a lens 2012. The lens holders can rotate around the post 2004 and the lenses can be moved as permitted by the ball and socket joints.

Figure 21:
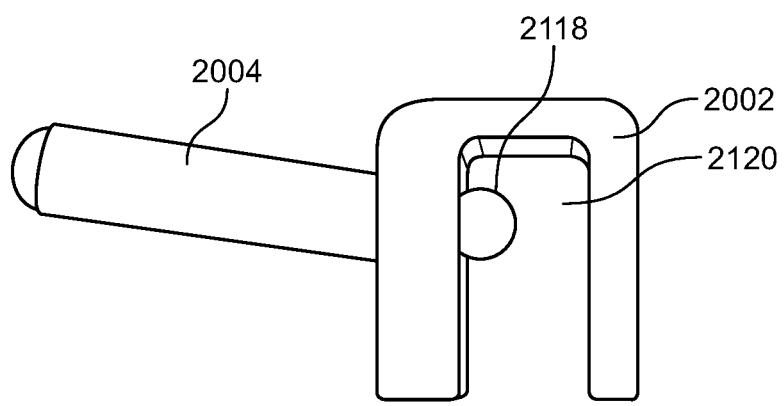
FIG. 21 includes an illustration of a post and support of the example loupe apparatus.
Figure 22:
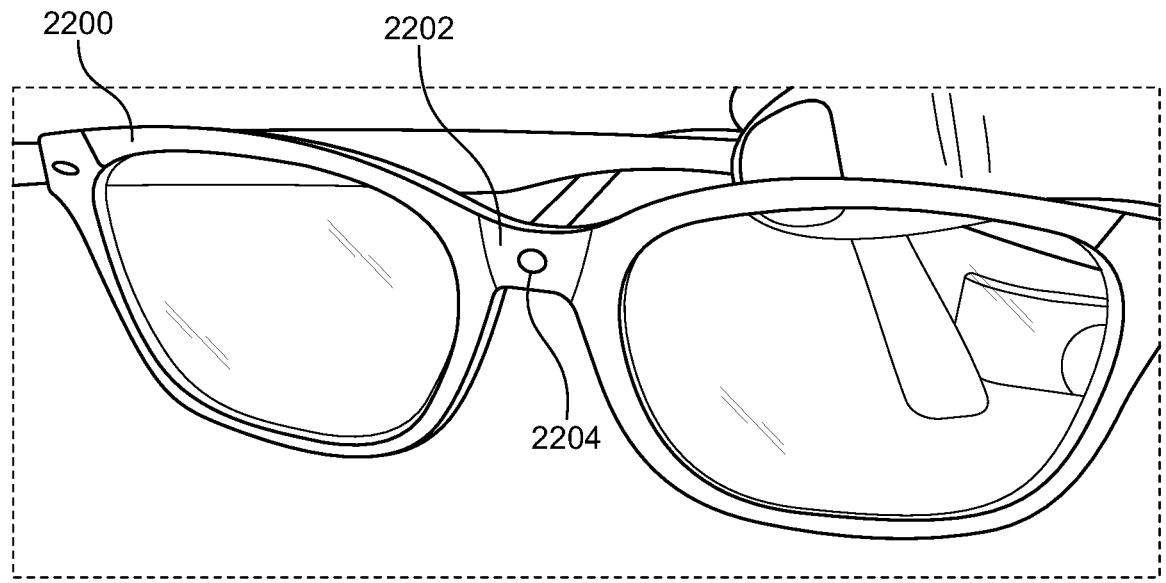
FIG. 22 includes an illustration of an example pair of glasses.

As illustrated in FIG. 21, the support 2002 secured to the post 2004 can include an opening 2120 to extend over a bridge of a pair of glasses. The support 2002 can further include a detent 2118 that engages a recess within the bridge of the glasses. For example, as illustrated in FIG. 22, a pair of glasses 2200 includes a bridge 2202 that includes a recess 2204 to receive the detent 2118 of the support 2002 of the loupe apparatus 2000.

Figure 23:
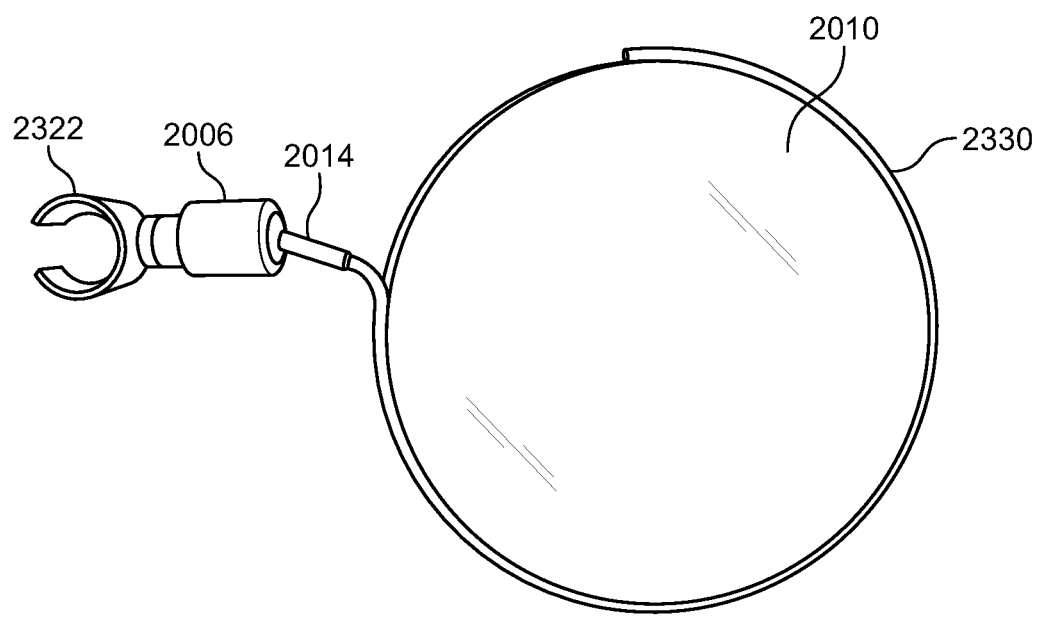
FIG. 23 and FIG. 24 includes an illustration of an example lens holder of the example loupe apparatus.

As illustrated in FIG. 23, the lens holders can include a tube 2322 to engage the post. The tube 2322 can be attached to an arm 2006 that engages an extension 2014 through ball and socket joint. A lens 2010 can be secured to the extension by a wire 2330 that engages a channel around the outside surface of the lens 2010.

Figure 24:
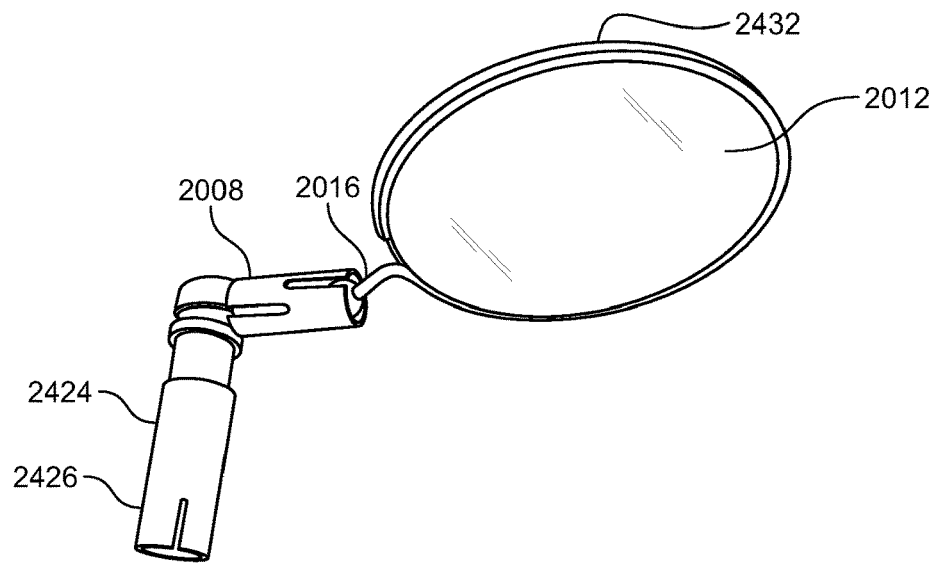

In another example of a lens holder illustrated in FIG. 24, a tube 2424 can include slots 2426 allowing the tube 2424 to expand and grip the post of the loupe apparatus. An arm 2008 can be secured to an extension 2016 by ball and socket joint. The lens 2012 can be secured to the extension 2016 by a wire 2432 extending along a groove on the outside circumference of the lens 2012. Optionally, the lenses 2010 or 2012 can be removable from the wires 2330 or 2432 and replaced with other lenses, for example, of different strength.

Figure 29:
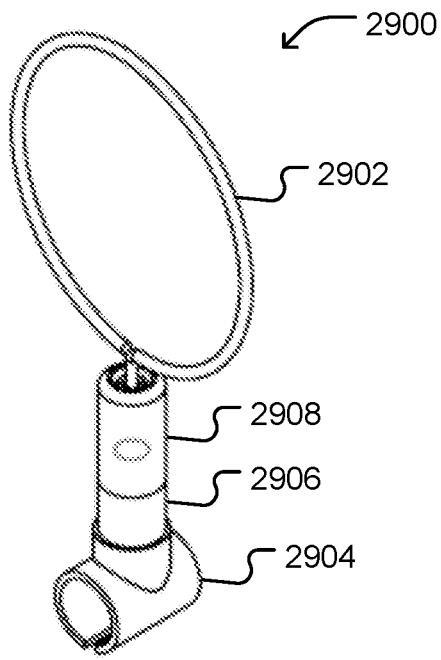
FIG. 29 and FIG. 30 include illustrations of an example lens holder.
Figure 30:
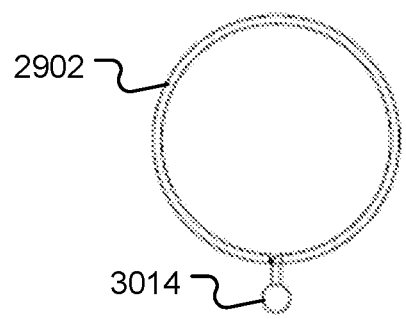
Figure 30:
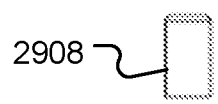
Figure 30:
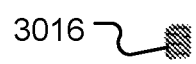
Figure 30:
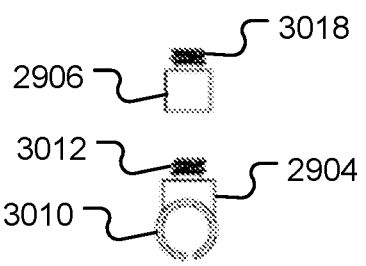

In a further example illustrated in FIG. 29 and FIG. 30, a lens holder 2900 includes a tube 2904 to couple to a post. For example, the tube 2904 can include slots. The lens holder 2900 can further include a wire 2902 to secure a lens. In an example, the wire 2902 can terminate in a ball 3014 that fits in an arm 2908 to form a ball and socket joint. An extension arm 2906 can be secured between the tube 2904 and the arm 2908. In an example, extension arms of different length or more than one extension arm 2906 can be used to adjust the distance between the post and the pupil of the user's eye. In particular, a length of the extension arm 2906 can be selected to fit the user's pupillary distance.

In an example, the tube 2904 to connect to a post can include a threaded connector 3012 to connect with the extension arm 2906, which can include a threaded connector 3018 to engage the arm 2908. In an example, a spring 3016 can be used to provide resistance to movement of the ball and socket joint formed by the ball 3014 of the wire 2902 and the arm 2908. For example, the threaded connector can be used to adjust the compression of the spring 3016 to further adjust the functionality of the lens holder.

Figure 25:
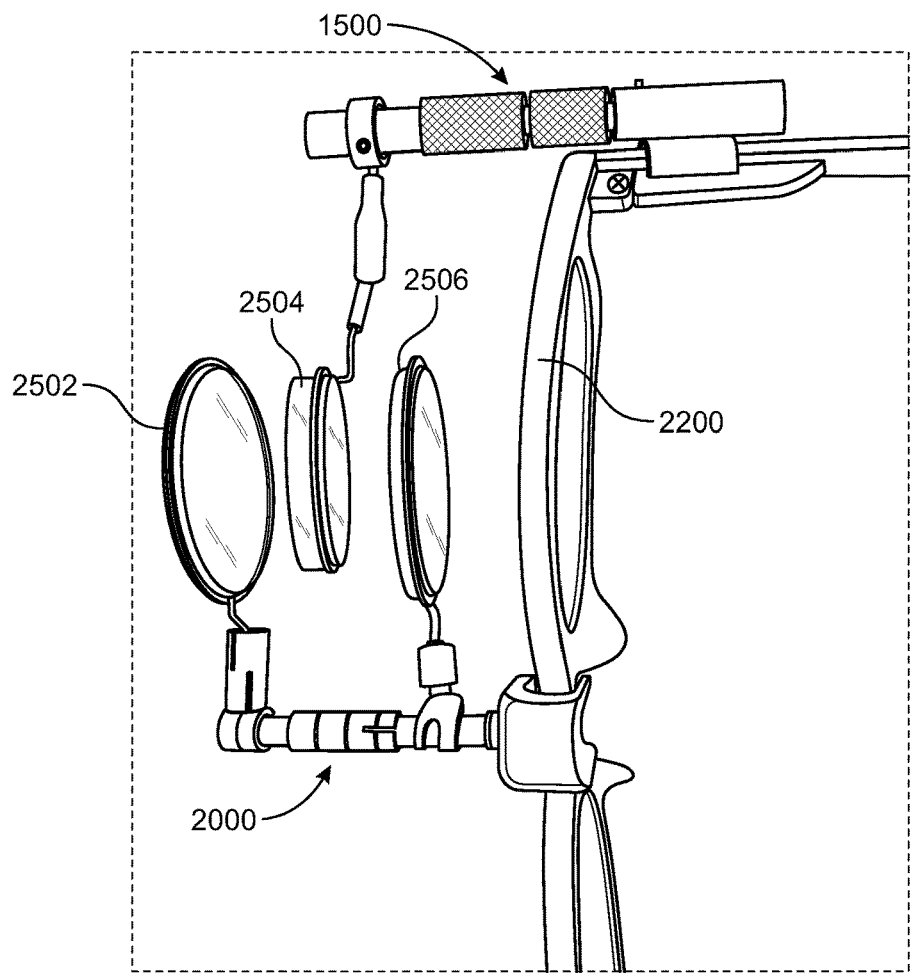
FIG. 25 includes an illustration of a system in which multiple loupe apparatuses are attached to a pair of glasses.

More than one loupe apparatus can be used together. For example, as illustrated in FIG. 25, and loupe apparatus 2000, for example illustrated in FIG. 20, can be secured to a pair of glasses 2200. A loupe apparatus 1500, for example, illustrated in FIG. 15, can be secured to a temple of the pair of glasses 2200. As such three lenses 2502, 2504, and 2506 can be used simultaneously for magnification. In particular, each of the lenses 2502, 2504, and 2506 can have a different strength.

Figure 26:
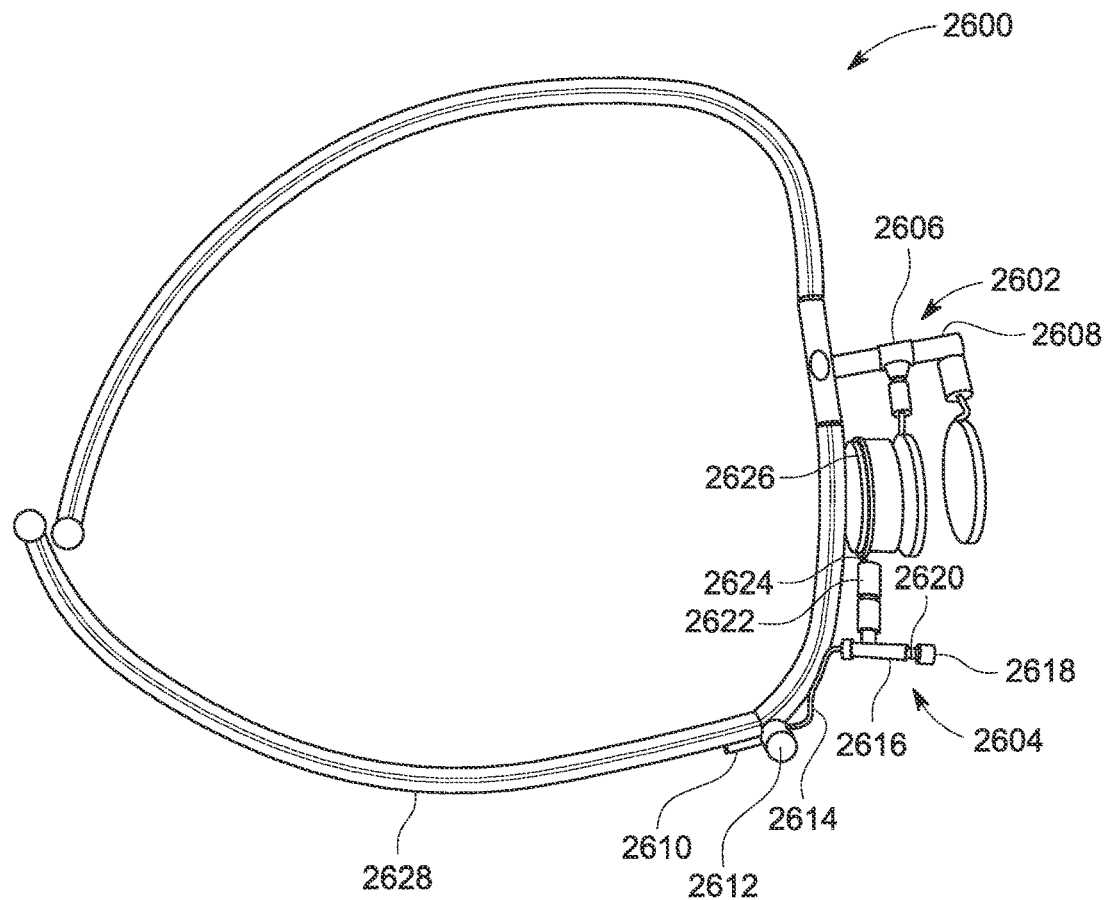
FIG. 26 includes an illustration of a further example loupe apparatus.
Figure 27:
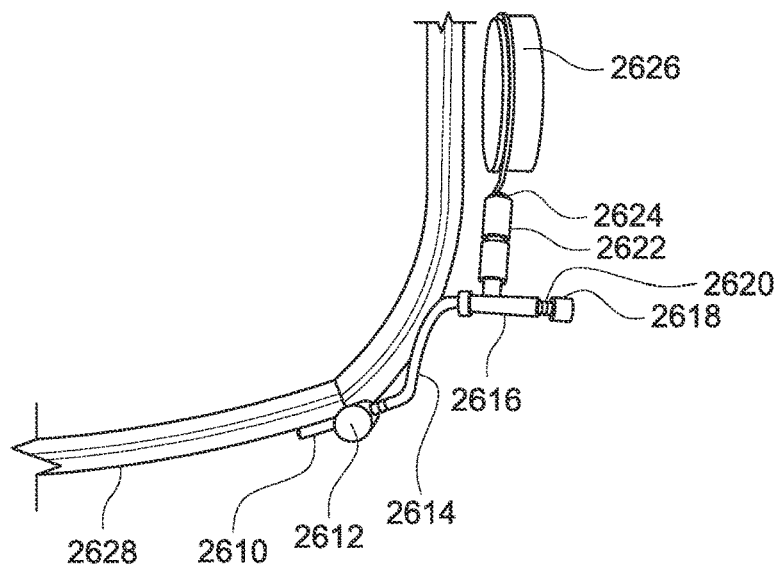
FIG. 27 includes an illustration of a part of an example loupe apparatus system.

In a further example, a three-lens loupe apparatus can be formed using headbands. For example, as illustrated in FIG. 26 and FIG. 27, a loupe apparatus 2600 can include a post secured to a nose bridge 2602 and can include lens holders 2606 and 2608. The support 2602 can include headbands 2628.

A second support 2610 can be secured to the headband at a side (or temple) of the headband 2628 and can include an adjustable connector 2612 to secure a wire post 2614. A lens holder 2604 is secured to the adjustable post 2614. The lens holder 2604 can include a tube 2616 that extends over the post 2614. A spring 2620 can be secured by a nut 2618 to hold the tube 2616 in place. An arm 2622 can be attached to the post 2612 and an extension 2624 can be attached to the arm 262 using a ball and socket joint. The extension 2624 secures a lens 2626. The lens holder 2604 is rotatable around the post 2614, and the lens is adjustable around the ball and socket joint.

An additional support 2610 and adjustable connector 2612 can be secured to an opposite side of the headband 2628. For example, the post 2614 and lens holder 2604 can be placed on either side of the head depending on which eye is dominant for the user. The post 2614 can be removed from the adjustable attachment 2612 and secured to the support and adjustable attachment on the opposite side of the headband. The lens holders 2606 and 2608 can rotate around the post of the support 2602 to be placed in front of the opposite eye.

Figure 28:
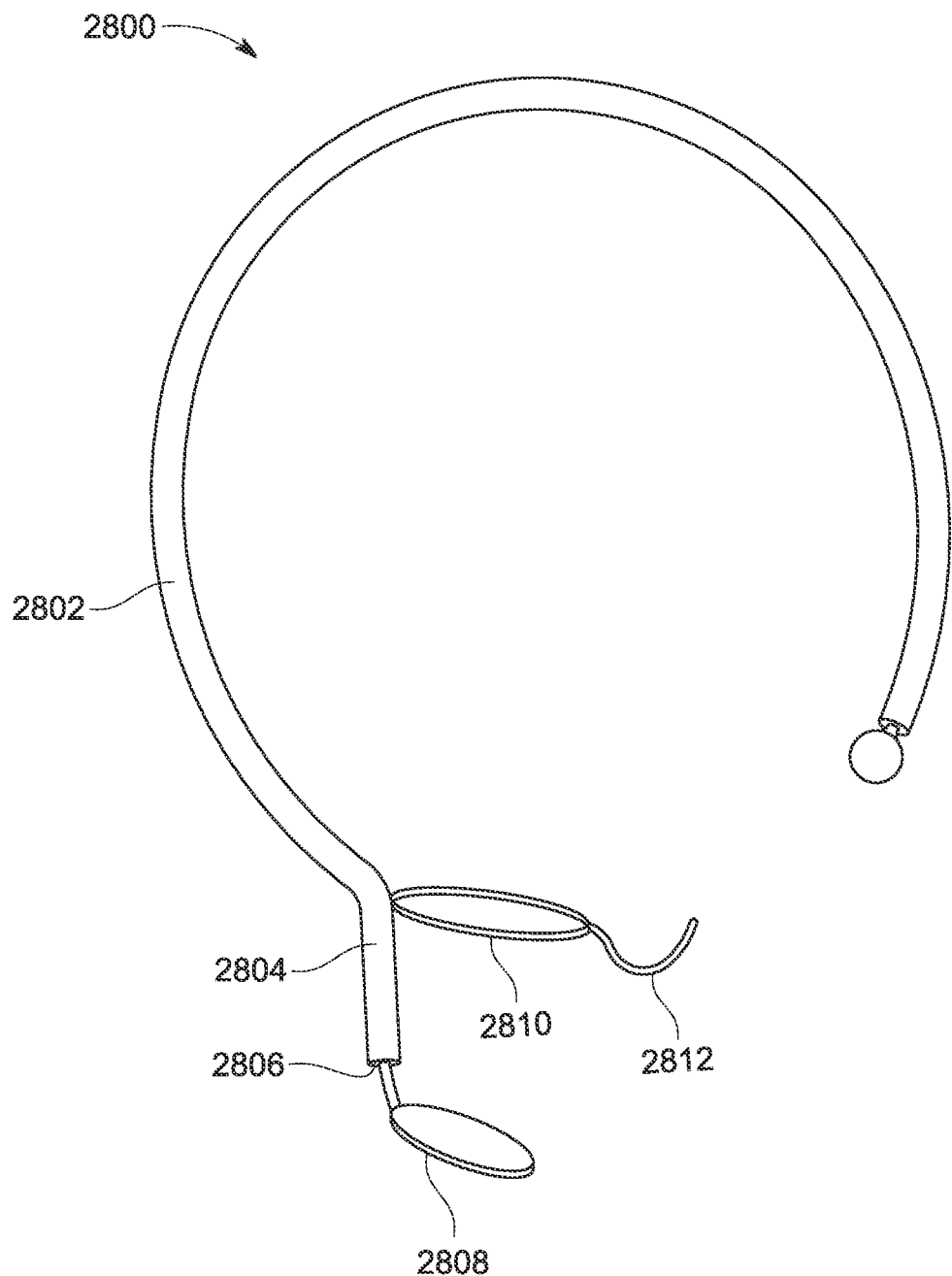
FIG. 28 includes an illustration of a further example loupe apparatus.

FIG. 28 illustrates a further embodiment of the loupe apparatus 2800 in which a headband 2802 is secured to a support 2804 that attaches to a ball and socket joint 2806 to which an extension that secures a lens 2808 is attached. A fixed frame 2810 attached to the support 2804 can also secure a lens. A nose bridge 2812 can be secured to the fixed frame 2810 distal from the support 2804 to which the frame 2810 is attached.

In a first aspect, a loupe apparatus includes a support, a post coupled to the support, and a lens holder rotatably coupled to the post. The lens holder is rotatable around an axis of the post. The lens holder includes an arm, an extension coupled to the arm with a ball and socket joint, and a lens coupled to the extension.

In an example of the first aspect, the lens holder further includes a tube disposed around the post, the arm coupled to the tube. For example, the arm is rotatably coupled to the tube with a fitting. In another example, the arm is rotatably coupled to the tube with a collar.

In another example of the first aspect and the above examples, the loupe apparatus further includes a second lens holder including a second arm, a second extension coupled to the second arm with a second ball and socket joint, and a second lens coupled to the second extension. For example, the second lens holder further includes a second tube disposed around the post, the second arm coupled to the second tube. In another example, the lens and the second lens have different strength In a further example of the first aspect and the above examples, the loupe apparatus further includes a second lens holder including a tube, a ball and socket joint disposed at a distal end of the tube, an extension attached to the ball and sock joint, and a second lens secured to the extension.

In an additional example of the first aspect and the above examples, the support is configured to be secured to a bridge of a pair of glasses. For example, the support includes a detent and the pair of glasses includes a recess to receive the detent.

In another example of the first aspect and the above examples, the support forms a nose bridge. For example, the nose bridge is attached to a headband. In another example, the headband is single sided. In a further example, the headband is two sided. In an additional example, the headband includes a wire with a polymeric cover. In another example, the headband includes a ball at a distal end.

In a further example of the first aspect and the above examples, the support is secured to a side of a headband.

In an additional example of the first aspect and the above examples, the support includes a coupling to attached to frame of a pair of glasses. For example, the coupling receives the post with an adjustable attachment.

In a second aspect, a loupe apparatus includes a support including a bridge coupled to a headband, a post coupled to the support, a first lens holder rotatably coupled to the post, and a second lens holder coupled to the post. The first lens holder is rotatable around an axis of the post. The first lens holder includes a first arm, a first extension coupled to the first arm with a first ball and socket joint, and a first lens coupled to the first extension. The second lens holder is rotatable around an axis of the post. The second lens holder including a second arm, a second extension coupled to the second arm with a second ball and socket joint, and a second lens coupled to the second extension.

In an example of the second aspect, the first lens holders includes a tube disposed around the post, the first arm secured to the tube.

In another example of the second aspect and the above examples, the first ball and socket joint is disposed proximal to a distal end of the post and in alignment with an axis of the post.

In a further example of the second aspect and the above examples, the first and second lenses has different strengths.

In an additional example of the second aspect and the above examples, the loupe apparatus further includes a second support coupled to the headband, a second post connected to the second support, and a third lens holder coupled to the second post.

In a third aspect, a loupe apparatus includes a support including a headband, a post coupled to the support, and a lens holder rotatably coupled to the post. The lens holder is rotatable around an axis of the post. The lens holder including an extension coupled to the post with a ball and socket joint and a first lens coupled to the extension. The loupe apparatus further includes a fixed lens holder coupled to the support including a lens and a nose bridge distal from the support. The fixed lens holder has a second lens.

In an example of the third aspect, the first and second lenses have different strengths.

Each of the above components can be formed of a metal or polymeric material. For example, the components can be formed of metals, such as nickel, copper, steel, aluminum, gold, silver, platinum, titanium, or alloys thereof, or combinations thereof. In another example, the components can be formed of polymeric materials, such as polycarbonate, polyamide, polyimide, polyolefin, silicone, cellulose acetate, or a combination thereof. The lenses can be formed of ceramic, glass, or polymeric materials, such as polycarbonate.

In each of the loupe apparatus embodiments, lenses of various strengths can be used. For example, lenses having magnification between 2× and 50× can be used. In an example, the lenses can have a magnification in a range of 2× to 20×. Further, in loupe apparatuses or combinations of loupe apparatuses including more than one lens, each of the lenses can have a different strength. Alternatively, each of the lenses can have the same strength. In particular, in a three-lens system, the lenses can have a 2×, 10×, and 20× strength. In a further example, the lenses can be of the same type (convex or concave) or can be of different types. In particular, a type of lenses, a strengths of the lens, a length of the post, a position of the lens holders on the post, a position of the lenses relative to each other and relative to the object of interest, or a combination of these factors changes the appearance of an object, particularly, the focus and magnification of the object.

In an additional example, the lens holders in each of the above embodiments can be configured to allow replacement or exchange of lenses. Further, the lens holders may be detachable from the posts to permit swapping of lens holders having different strength lenses.

While the loupe apparatuses are illustrated for right eye dominance, the loupe apparatuses and systems can be configured for left eye dominance. In particular, those loupe apparatuses with a support and post proximal to a bridge of the nose of a user can permit the lenses to be placed in front of either eye of the user.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A loupe apparatus comprising:
    a support;
    a post coupled to the support; and
    a lens holder rotatably coupled to the post, the lens holder rotatable around an axis of the post, the lens holder comprising:
        an arm;
        an extension coupled to the arm with a ball and socket joint; and
        a lens coupled to the extension;
    wherein the support forms a nose bridge and wherein the nose bridge is attached to a headband.

2. The loupe apparatus of claim 1, wherein the lens holder further includes a tube disposed around the post, the arm coupled to the tube.

3. The loupe apparatus of claim 2, wherein the arm is rotatably coupled to the tube with a fitting.

4. The loupe apparatus of claim 2, wherein the arm is rotatably coupled to the tube with a collar.

5. The loupe apparatus of claim 1, further comprising a second lens holder comprising:
    a second arm;
    a second extension coupled to the second arm with a second ball and socket joint; and
    a second lens coupled to the second extension.

6. The loupe apparatus of claim 5, wherein the second lens holder further includes a second tube disposed around the post, the second arm coupled to the second tube.

7. The loupe apparatus of claim 5, wherein the lens and the second lens have different strength.

8. The loupe apparatus of claim 1, further comprising a second lens holder including a tube, a ball and socket joint disposed at a distal end of the tube, an extension attached to the ball and sock joint, and a second lens secured to the extension.

9. The loupe apparatus of claim 1, wherein the headband is single sided.

10. The loupe apparatus of claim 1, wherein the headband is two sided.

11. The loupe apparatus of claim 1, wherein the headband includes a wire with a polymeric cover.

12. The loupe apparatus of claim 1, wherein the headband includes a ball at a distal end.

13. A loupe apparatus comprising:
    a support including a nose bridge coupled to a headband;
    a post coupled to the support;
    a first lens holder rotatably coupled to the post, the first lens holder rotatable around an axis of the post, the first lens holder comprising:
        a first arm;
        a first extension coupled to the first arm with a first ball and socket joint; and
        a first lens coupled to the first extension; and
    a second lens holder coupled to the post, the second lens holder rotatable around an axis of the post, the second lens holder comprising:
        a second arm;
        a second extension coupled to the second arm with a second ball and socket joint; and
        a second lens coupled to the second extension.

* * * * *